Figure 1:
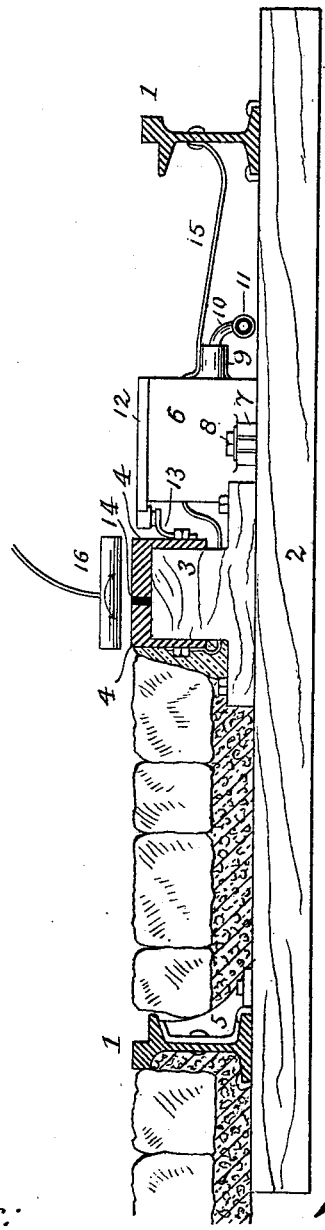

No. 631,073. Patented Aug. 15, 1899.
W. GRUNOW, Jr.
CONTACT SYSTEM FOR ELECTRIC RAILWAYS.
(Application filed Feb. 3, 1899.)

(No Model.) 9 Sheets—Sheet 1.

Witnesses:
E. B. Bolton
M. L. Shay

Inventor:
William Grunow Jr.
By Charles S. Rogers
his Attorney.

No. 631,073. Patented Aug. 15, 1899.
W. GRUNOW, Jr.
CONTACT SYSTEM FOR ELECTRIC RAILWAYS.
(Application filed Feb. 3, 1899.)

(No Model.) 9 Sheets—Sheet 2.

WITNESSES
James F. Duhamel.
M. L. Shay.

INVENTOR
William Grunow Jr.
BY
Charles S. Rogers
ATTORNEY

No. 631,073. Patented Aug. 15, 1899.
W. GRUNOW, Jr.
CONTACT SYSTEM FOR ELECTRIC RAILWAYS.
(Application filed Feb. 3, 1899.)
(No Model.) 9 Sheets—Sheet 3.

WITNESSES
INVENTOR
William Grunow Jr.
BY
Charles S. Rogers
ATTORNEY

No. 631,073. Patented Aug. 15, 1899.
W. GRUNOW, Jr.
CONTACT SYSTEM FOR ELECTRIC RAILWAYS.
(Application filed Feb. 3, 1899.)
(No Model.) 9 Sheets—Sheet 6.
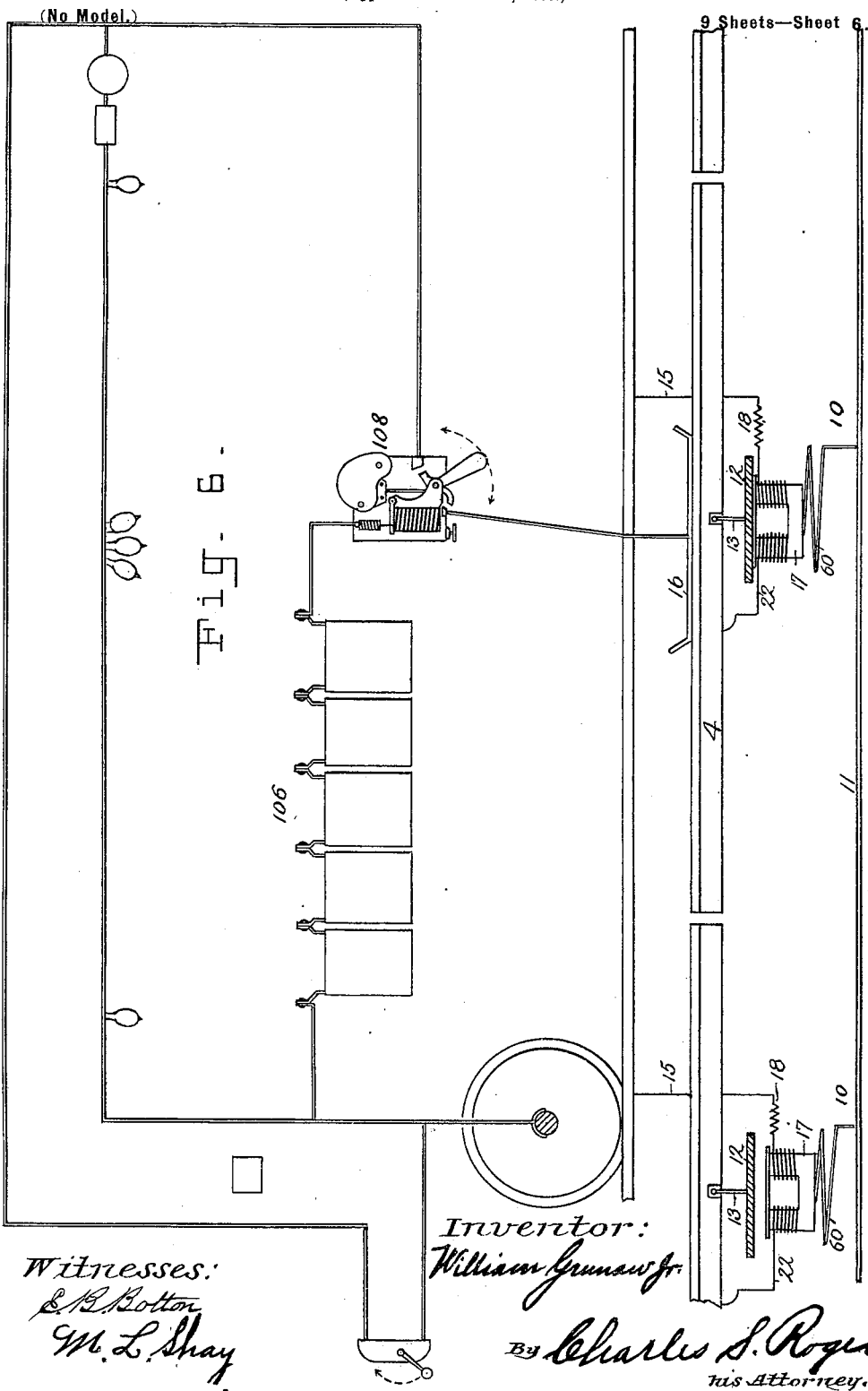

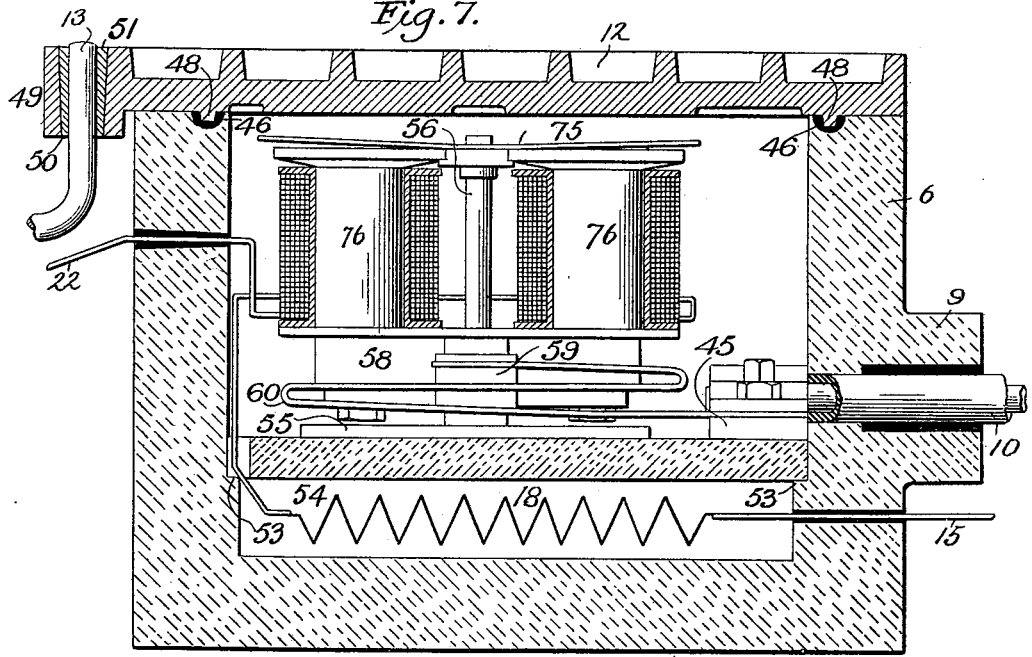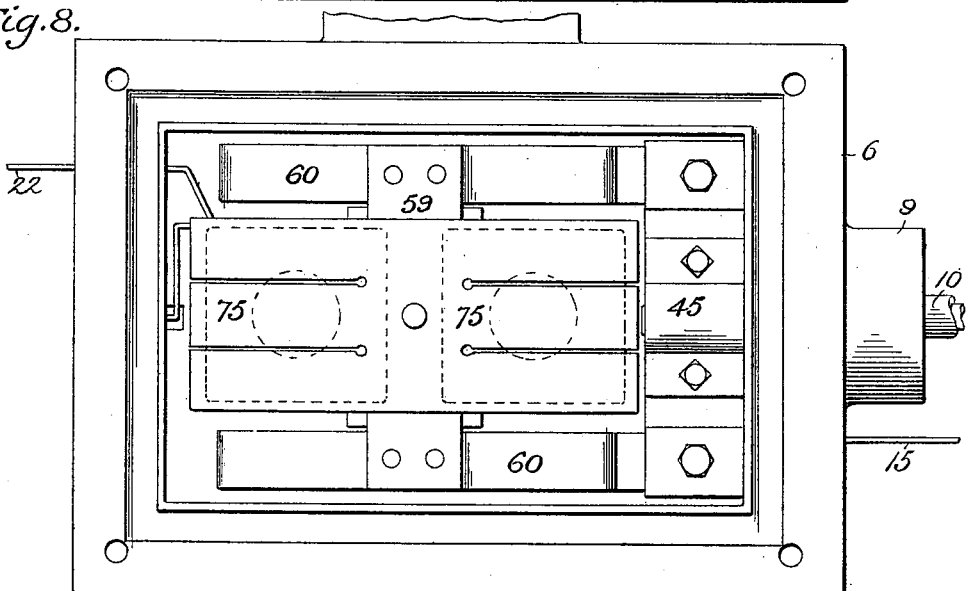

No. 631,073. Patented Aug. 15, 1899.
W. GRUNOW, Jr.
CONTACT SYSTEM FOR ELECTRIC RAILWAYS.
(Application filed Feb. 3, 1899.)
(No Model.) 9 Sheets—Sheet 8.
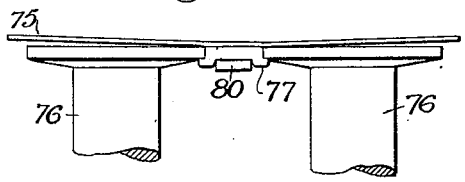
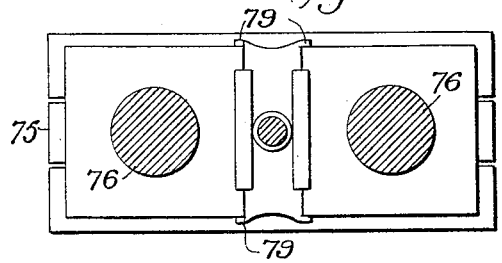
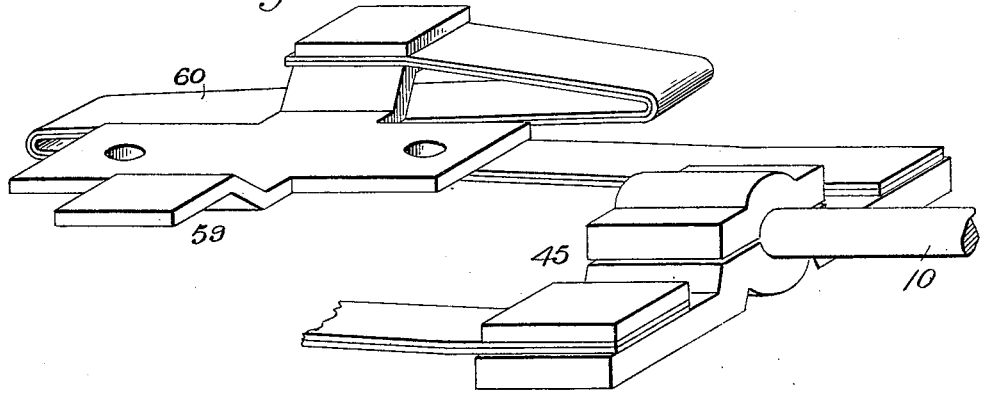
WITNESSES
INVENTOR
William Grunow Jr.
BY
Charles S. Roger
ATTORNEY No. 631,073. Patented Aug. 15, 1899.
W. GRUNOW, JR.
CONTACT SYSTEM FOR ELECTRIC RAILWAYS.
(Application filed Feb. 3, 1899.)
(No Model.) 9 Sheets—Sheet 9.
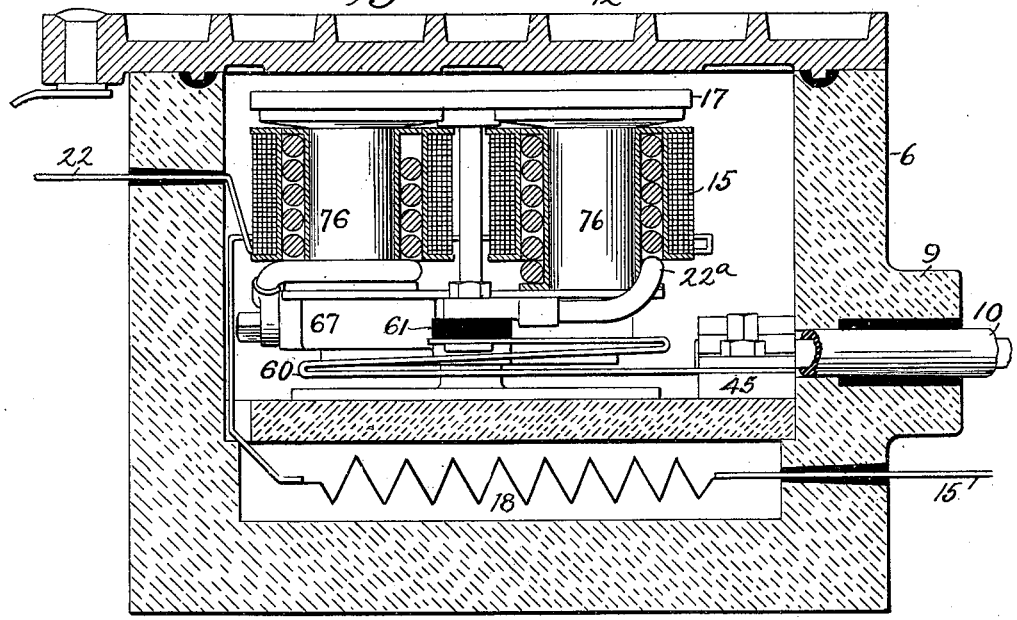
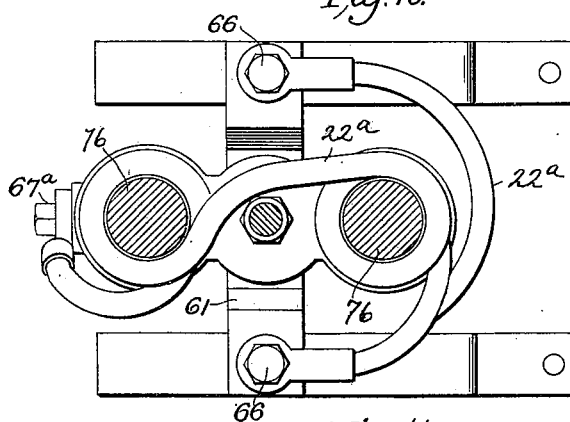
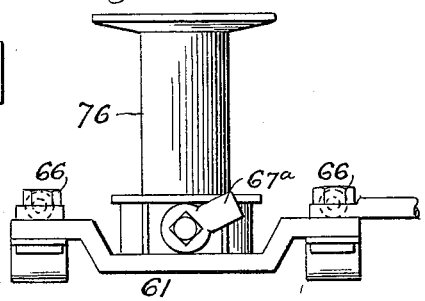
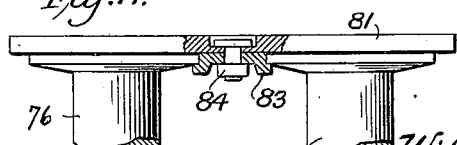
WITNESSES
INVENTOR
William Grunow Jr.
BY
Charles S. Rogers
ATTORNEY

UNITED STATES PATENT OFFICE.

WILLIAM GRUNOW, JR., OF BRIDGEPORT, CONNECTICUT, ASSIGNOR OF TWO-THIRDS TO JAMES H. McELROY, OF SAME PLACE, AND JOSEPH A. McELROY, OF NEW YORK, N. Y.

CONTACT SYSTEM FOR ELECTRIC RAILWAYS.

SPECIFICATION forming part of Letters Patent No. 631,073, dated August 15, 1899.

Application filed February 3, 1899. Serial No. 704,410. (No model.)

*To all whom it may concern:*

Be it known that I, WILLIAM GRUNOW, Jr., a citizen of the United States, residing at Bridgeport, in the county of Fairfield and State of Connecticut, have invented certain new and useful Improvements in Contact Systems for Electrical Railways; and I do hereby declare the following to be a full, clear, and exact description of the invention, such as will enable others skilled in the art to which it appertains to make and use the same.

This invention relates to electrical railways, and particularly to an improved system of forming contact between the supply-conductor and a double or "twin" working conductor; and some of the objects of the invention are to provide a working conductor which will be normally "dead" or unenlivened, and to produce means for forming contact between the supply and working conductors, to charge that section of the latter immediately in use or directly under the vehicle, and, further, to produce means whereby the section so charged will automatically become dead or unenlivened as soon as the vehicle shall have passed beyond the same.

Another object is to dispense with the electromagnets upon the vehicle, to attract the contact device and close the circuit through the working conductors, and, further, to provide a system by means of which the contact devices are operated positively and quickly to charge in advance the immediately preceding section of the working conductors and close the circuit therethrough as soon as the current-collector enters upon the same in order that a high rate of speed may be attained by the vehicle and perfect contact be assured.

A further object is to produce a contact device constituting a terminal of the supply-conductor and adapted to be actuated by an independent circuit and to break contact by gravitation.

With these and other objects in view the invention consists, essentially, of the construction, combination, and arrangement of parts, substantially as hereinafter more fully described in the following specification and illustrated in the accompanying drawings, in which—

Figure 2:
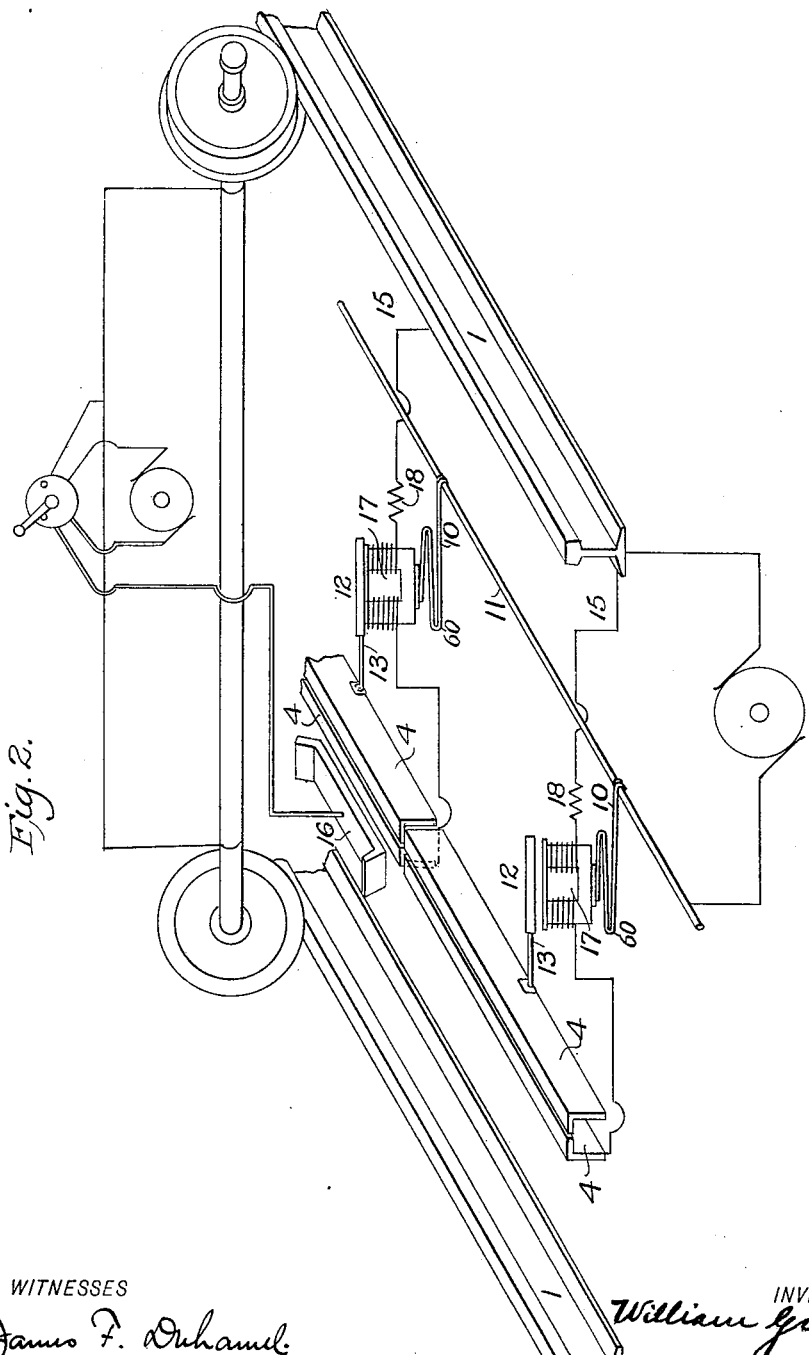
Figure 3:
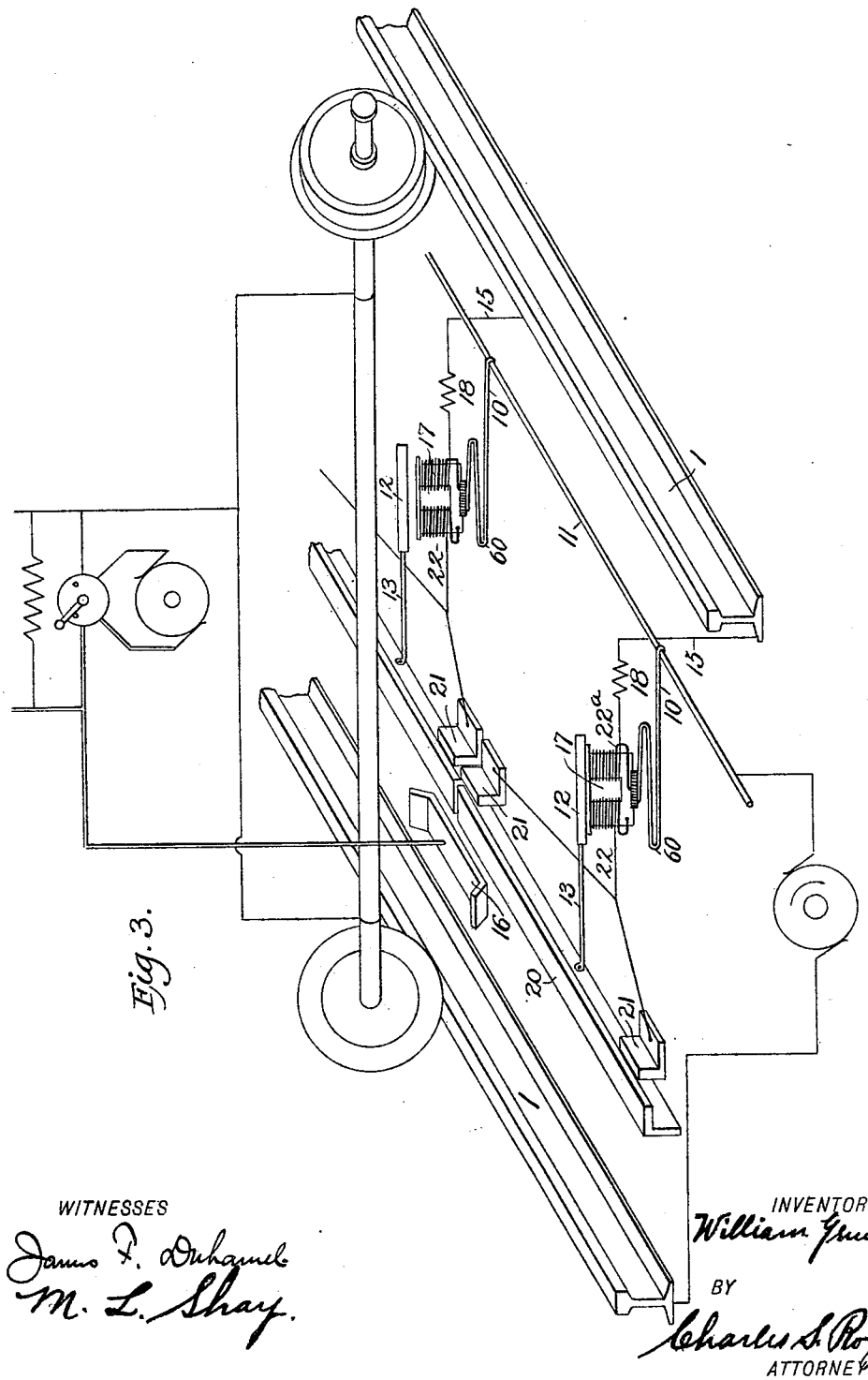
Figure 4:
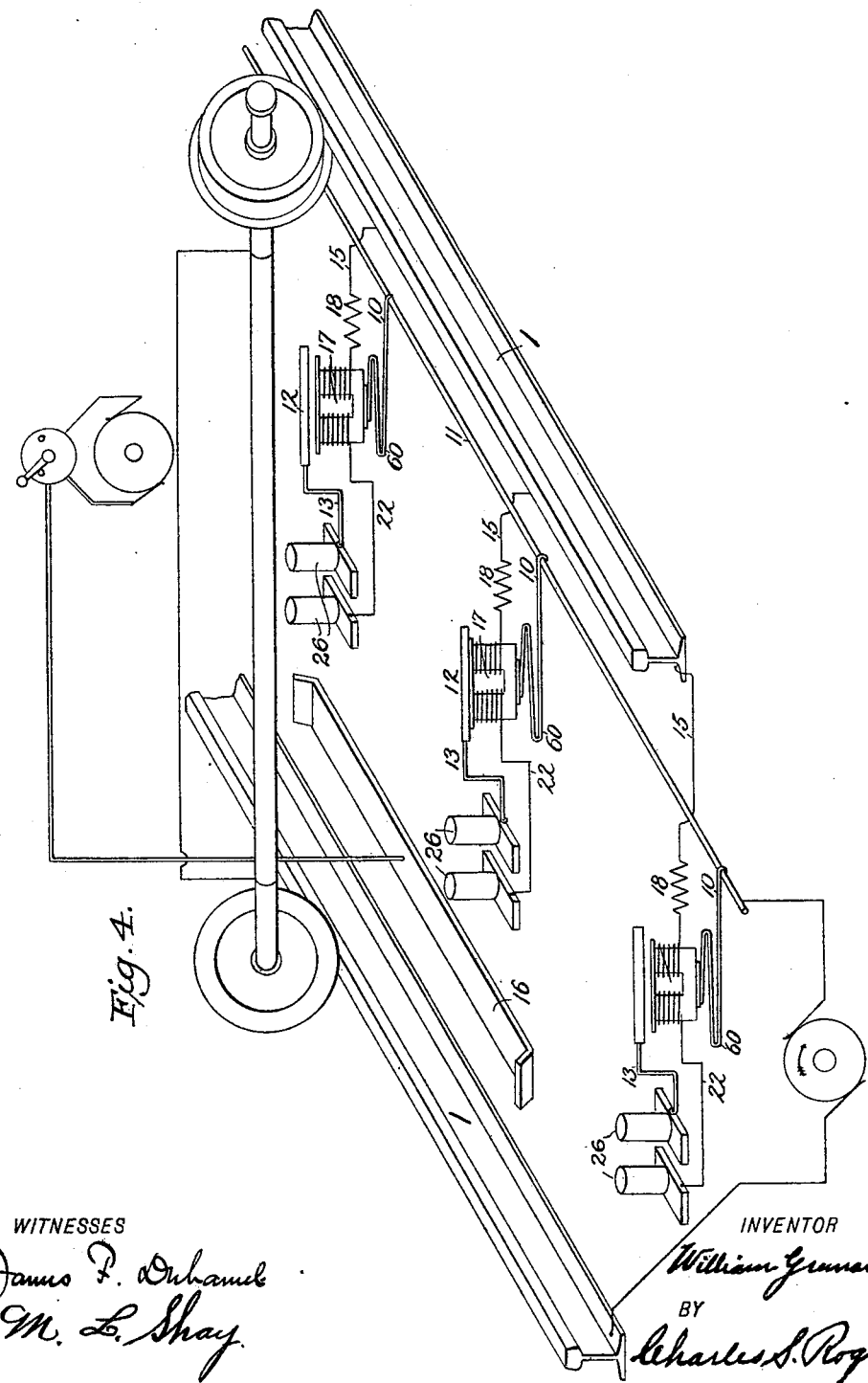
Figure 5:
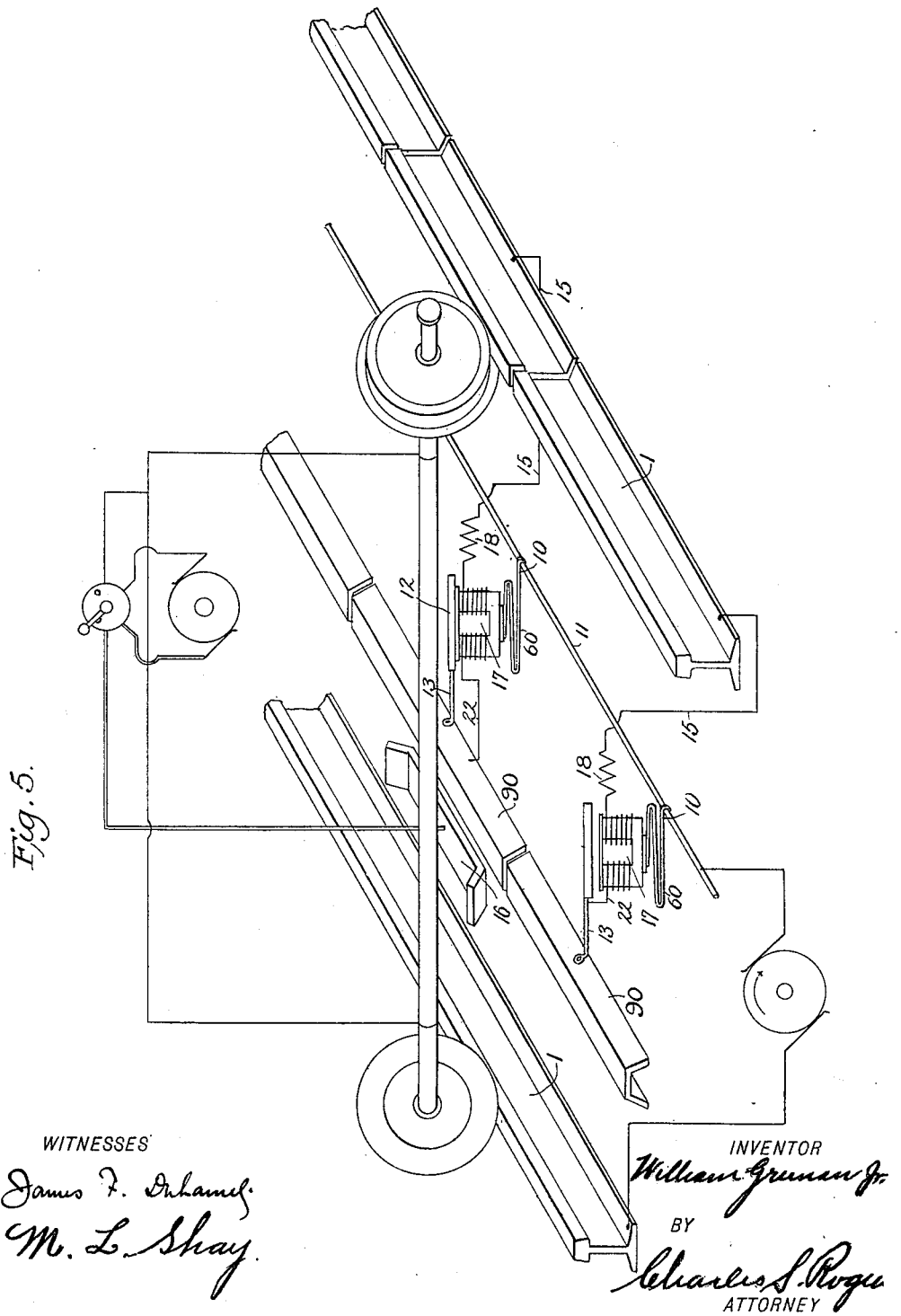

Figure 1 is a cross or transverse section of a street-railroad bed, illustrating the manner of securing the track or service rails and sections of the working conductors in position. Fig. 2 is a diagrammatic view showing a twin or double sectional working conductor with contact devices, the track or service rails, the supply-conductor, and the car windings or connections. Fig. 3 is a diagrammatic view illustrating a working conductor, consisting of a sectional rail with its adjacent energizing sections, a compound-wound contact device, car-wiring, and connections. Fig. 4 is a similar view showing twin posts constituting a working conductor and a long collector operating therewith, also car-wiring and connections. Fig. 5 is a diagrammatic view showing a single working conductor and one sectional service or track rail and one continuous service or track rail, together with electrical connections and contact device terminal. Fig. 6 is a diagrammatic view of the wiring and connections of a motor-car or vehicle, showing the storage battery and automatic circuit-breaker. Fig. 7 is a longitudinal section of one of the contact-receptacles with a single or "shunt" winding, showing the contact mechanism in elevation. Fig. 8 is a top plan view of the same with the top or cover removed. Fig. 9 is a longitudinal sectional view of the copper contact-plate, showing the manner of attaching the same. Fig. 10 is a bottom plan view of the same. Fig. 11 is a longitudinal section of a carbon contact-plate, showing manner of attachment. Fig. 12 is a longitudinal section of a contact-receptacle with both secondary or shunt and feeder windings, showing contact mechanism in elevation. Fig. 13 a top plan view of the feeder-winding about the magnet-cores, connections thereof with the flexible connections, and the final connection of the feeder with the core. Fig. 14 is an end elevation of the magnet-core, showing terminals of feeder-windings and the insulating magnet-connector carrying the flexible connections; and Fig. 15 is a perspective view of the flexible connections, the feeder connections, and magnet connections.

Similar characters of reference designate corresponding parts throughout the several views.

Referring to the drawings, and particularly to the construction shown in Fig. 1 thereof, the reference character 1 designates the track or service rails of the ordinary construction, which are preferably spiked or otherwise secured to suitable beams or cross-ties 2, upon which, preferably midway between the track-rails, is suitably secured a creosoted continuous stringer or timber 3, or creosoted wooden blocks may be substituted for the stringer, if desired. Upon the stringer or blocks are preferably secured the sections of the twin or double working conductor 4, here illustrated as formed of angle-irons; but any preferred form or construction of the same may be employed, and the sections of the working conductors may be secured in position upon the stringer or blocks 3 in any desired manner, and the extremities thereof may be inclined or beveled to lessen the impact of the current-collector or shoe in passing over the same.

If desired, a metallic brace 5 may be secured to the cross-ties inside of the track-rails 1 to provide additional strength and rigidity therefor, and the service or track rails are suitably connected or bonded, and the return current is conveyed through the same.

Suitably secured upon the cross-ties 2 by spikes or bolts are the contact-receptacles 6, preferably provided with attaching-lugs 7, adapted to receive spikes or bolts 8, whereby said receptacles are secured in position, and the receptacles 6 are preferably provided with a tubular projection 9 to receive the branch 10 of the supply-conductor or feeder-cable 11, as shown.

The receptacles 6 are preferably provided with tops or covers 12, of conductive material, connected by a bond 13 with the adjacent working conductor 4, and, if desired, the working conductors may be separated longitudinally by suitable insulation 14, and the section of the working conductor more remote from the contact-receptacle is preferably connected to the track or service rail 1 by a conductor 15, as clearly shown in Fig. 1 of the drawings.

A collector or shoe 16 of any preferred construction is employed to take up the supply-current from the working conductor after the latter has been charged by the contact device through the top 12 and bond 13, as will be hereinafter more fully explained.

The construction illustrated in Fig. 1 is particularly adapted for a street-railroad bed; but I do not confine myself to the particular construction and arrangement therein shown, as the same may be varied in practice, if found desirable.

In Fig. 2 is illustrated by means of a diagrammatic view the twin or double sectional working conductor 4, one of which is connected by a bond 13 with the top or cover 12 of the contact-receptacle, (not shown,) and the other working conductor is connected by a conductor 15 to the track or service rail 1 after said conductor has been wound about the contact device 17, as shown. A resistance 18, consisting of electric incandescent lamps, or any suitable material or substance or compound, or copper, iron, steel, German silver, wires, or bands wound and sustained in the usual waterproof manner, or carbon or graphite rods or plates, may be interposed between the contact device 17 and the track or service rail 1, as shown, for the purpose of reducing the secondary or shunt circuit to lower voltage sufficient to energize the contact device 17 and raise the same into contact with the top or cover 12 and charge that section of the working conductor, as hereinafter more fully described.

The twin or double working conductors are preferably divided into sections of predetermined lengths, preferably isolated or insulated from each other, and the ends of the sections may be beveled to reduce the impact of the collector 16, which may move along the upper surface or sides of the working conductor and is preferably of sufficient width to bridge or span both conductors.

The construction illustrated in Figs. 1 and 2, before described, operates in the following manner: As soon as the current-collector 16 enters upon the section of the twin or double sectional working conductor the current passes through the member thereof more remote from the contact device or supply-terminal 17, through the shunt or energizing circuit, energizing the contact device 17, through the resistance 18, connection 15, to the track or service rail 1, through the vehicle wheel and connections to the controller and motor, as will be readily understood. When the contact device 17 is energized in the manner just described, it will be raised into contact with the top or cover 12 of the contact-receptacle, (not shown,) thus causing the full current from the supply-conductor or feeder-cable 11 to pass through the branch 10 thereof, the contact device 17, top or cover 12, and bond 13 to the adjacent member of the working conductor 4, from which the working current is picked up by the collector or shoe 16 and conveyed to the controller and motor in the usual manner.

In Fig. 3 is shown a construction similar to that illustrated in Fig. 2 with the exception that the working conductor consists of a sectional rail 20 and a plurality of blocks 21 or similar devices connected to the secondary coil 22 upon the contact device 17, which is also provided with another winding-coil, constituting a continuation of the supply-conductor 11, as will be explained more fully hereinafter. The member 20 of the working conductor is bonded at 13 to the top or cover 12 of the contact-receptacle, (not shown,) and the branch 10 of the supply-conductor 11 is wound about the cores of the contact device 17, thus making the same the terminal of the supply-current, so that the contact device 17 will when raised into contact with the top or cover 12 transmit the working current therethrough by means of the bond 13 to the member 20 of the working conductor, from which it is taken up by the current-collector 16, as before described. Meanwhile, the contact device 17 is converted into an electromagnet by reason of the supply-current passing through the windings about the same, and this electromagnetic terminal of the supply-conductor being of bipolar construction will also complete a closed magnetic circuit when thus raised into contact with the top or cover of the receptacle when the working circuit is closed. The sole object of this feeder-winding or supply-coil 22ª is to assist with the secondary or shunt coil in energizing the contact device 17 when the same is raised into contact against the cover or top 12 of the contact-receptacle (not shown) and the circuit is closed. The secondary coil 22 is suitably connected with the blocks 21 and a resistance 18, having connection with one track or service rail 1, and the function of this secondary coil is to energize the contact device 17 and raise the same into contact with the top or cover 12, as before described, and is connected in shunt across the service-conductor and one member of the working conductor.

Further description of the operation of the construction illustrated in Fig. 3 will not be necessary here.

Still another construction of working conductor is shown in Fig. 4, wherein contact-posts 26 are preferably employed instead of the twin working conductor heretofore described, and a long collector or shoe 16 is used to bridge the distance between these posts. The post nearer the contact device 17 is preferably connected to the top or cover 12 of the contact-receptacle (not shown) by a bond 13, and the remote post is connected to the contact device 17 by a conductor 31, which is wound about the cores of the contact device 17 and connected with a suitable resistance 18, having suitable connection 15 with a track or service rail 1 in the manner before described, and the remaining construction and arrangement are similar to that described in connection with Fig. 2, and further description thereof in connection with this figure will be unnecessary. The current from the generator is supplied to the contact device 17 through branch connection 36 of the supply-conductor 11 or in any other manner, and the current may be branched and supplied to any number of contact-receptacles, and it will be understood that the track or service rails are suitably bonded and that the return current is conveyed therethrough to the generator.

In Fig. 5 of the drawings is illustrated a construction wherein only a single working conductor 90 is employed, preferably of the form shown, and the current-collector 16 may move along the top or side thereof, if desired, and each section of said conductor is bonded at 13 to the top or cover of one of the contact-receptacles, (not shown,) the contact device or supply-terminal 17 having suitable branch connections 95 with the supply or feeder conductor 11, as before described. One end of the energizing or shunt coil 97 is connected to one of the track or service rails 1, which is preferably divided into sections of the same length as the sections of the single or working conductor 90 and substantially constitutes the other member of the working conductor, as will be readily understood, and is then connected with a suitable resistance 18, after which the secondary or shunt coil passes around the cores of the contact device 17, and the other end thereof may be connected to the top or cover 12 or with the adjacent section of the working conductor 90 in Fig. 5 of the drawings.

The operation of the construction shown in Fig. 5 is substantially as follows: The current passes through the section 1 of the sectional service or track rail through the connector 15, resistance 18, around the cores of the contact device 17, through from the top or cover 12, the bond 13 to the adjacent section of the single working conductor 90, from which it is taken up by the current-collector or shoe 16 when the vehicle or motor-car enters upon that section of the working conductor and sectional rail or service conductor, as will be readily understood.

Referring to Fig. 6 of the drawings, I have illustrated a separate means for energizing the shunt-coil or secondary winding of the contacting terminal or contacting device 17, preferably consisting of a separate current furnished by primary or storage battery 106, desirably consisting of a few cells and carried by the vehicle or motor-car, the electrical connections and wirings of which I have here illustrated. The object of this separate battery-circuit is to energize the contact device 17 and raise the same into contact with the top or cover 12 of the contact-receptacle (not shown) and to keep the contact device in such position to retain the feeder-circuit closed, even should the generated current have been cut off at the generating-station for any reason or by accident. By reason of this construction when the supply-current has been regenerated or started again the same will enter that section of the working conductor over which the vehicle or motor-car is located by reason of the circuit having been kept closed, whereupon the battery-circuit will instantly be cut out of circuit by means of an automatic switch or magnetic blow-out 108, carried by the vehicle or motor-car, as will be readily understood. In this construction the supply-conductor 11 is connected with the contact devices 17 by branches 110, as before described, and the tops or covers 12 of the contact-receptacles (not shown) are provided with bonds 13 with the adjacent sections 4 of the working conductor, and when the contact device 17 is in contact with the top or cover 12 the supply-current passes therethrough, through said bond 13 to the section of the working conductor 4, from whence it is taken up by the current-collector or shoe 16 and conveyed to the controller and motor, as hereinbefore explained. The energizing coil or winding 22 is connected at one end to the adjacent section 4 of the working conductor, passes around the cores of the contact device 17, and is connected to a suitable resistance 18, which is connected by a suitable conductor 15 with one of the bonded track or service rails 1 in the manner hereinbefore stated, so that as soon as the current-collector or shoe 16 enters upon the section of the working conductor 4 the energizing-circuit is closed through the vehicle and the contact device 17 is raised into contact with the top or cover 12, and the working current is thus conveyed to the adjacent section of the working conductor.

Referring to Figs. 7 to 15, inclusive, of the drawings, the reference character 6 designates a contact-receptacle, preferably constructed of glazed vitrified brick or of well-creosoted wood, although any other suitable material may be employed, and the receptacles may be molded or pressed into the desired shape or form, which will be varied, as found desirable in practice. The receptacles are preferably provided with metallic covers or tops of malleable or cast iron or steel or any composition of the same, which may be removably secured in position by bolts or similar devices, and the receptacles are preferably located in proximity to the section of the working conductor with which their covers are connected or bonded. The construction of the receptacles 6 is preferably substantially as shown, and they may be provided with end or side attaching extensions or flanges 7, wherein are preferably formed openings or notches 42 to receive a spike or bolt, by means of which the receptacles are secured in position upon the beams or cross-ties, as before described. The contact-receptacles are also preferably provided with a laterally-extending tubular projection 9, through which the supply-conductor or feeder-cable 11 or a branch connection thereof enters the receptacle in a watertight manner, the extremity of said supply-conductor being preferably connected by a connector-clamp 45, of any preferred construction, resting upon the bottom of the receptacle and extending along one side thereof, as shown in Figs. 7 and 12 of the drawings. The rim of the receptacles 6 is preferably provided with a recess or groove 48, which may be filled with asphaltum or other suitable material to insure a water-tight inclosure, and the metallic top or cover 12 of the receptacles is preferably removably secured in position by means of bolts or screws, and the cover 12 is preferably provided with a rib 48, adapted to enter the recess 46 in the rim of the receptacles. The cover 12 projects beyond one end of the receptacle, as shown at 49, Figs. 7 and 12, and is provided with an opening 50, adapted to receive a tubular or solid plug 51, which may be conical, carrying a bond or connection 13, which may be either round or flat in shape, leading from one of the twin working conductors, and the inner or under surface of the top or cover 12 is preferably planished or ground flat and smooth to afford good contact-surface for the contact device hereinafter described.

Preferably resting upon the shoulders or ledges 53, near the bottom of the contact-receptacles 6, is a removable tray 54, desirably of slate or creosoted wood, to which is connected a base or plate 55, provided with a guide-rod 56, preferably of non-magnetic material, upon which is freely and independently mounted a contact device or electromagnetic terminal 17 of the supply-conductor 11, preferably constructed of cast-steel, malleable, cast, or wrought iron. The contact device 17 is preferably provided with a bottom portion or yoke 58, having a central opening to freely or loosely receive the guide-rod 56 in such a manner as to provide for the free and independent movement of the contact device upon said rod. Formed upon or connected with the under surface of the contact device 17 is a metallic connecting-arm 59, adapted to receive and retain one end of the flexible conductors 60, Figs. 7 and 8, the other end whereof is retained by the connector-clamp 45, as before described, thus assuring to the contact device a free and independent movement.

When a compound-wound core is employed, the connecting-arm 61 is preferably secured to the contact device in the same manner as before described; but the arm 61 preferably consists of insulating material—such as compressed fiber, hard rubber, or other suitable insulating material—to which is attached one end of the flexible conductors 60; but the connections are preferably such that the contact device 17 is electrically insulated from said conductors 60, as shown in Figs. 12, 13, and 14 of the drawings.

Where a compound-wound core is used, Figs. 12, 13, and 14, an insulated conductor 11 of the required carrying capacity is preferably wound around the cores or headed projections 76 of the contact device, and one extremity of said conductor is preferably connected by insulated bolts 66 to each of the flexible conductors 60, and the other end of the same is preferably metallically connected to the base or yoke 67 of the contact device, preferably by means of a clamp or bolt 67$^a$, as shown in detail in Figs. 13 and 14. By means of this construction the contact device is made a terminal of the feeder or supply current and when raised into contact with the top or cover of the contact-receptacle transmits the generated or supply current through the same and the bond to the adjacent section of the working conductor.

It will be understood that the contact device is converted into an electromagnet by reason of the supply-current passing through the windings or coil about the same, and this electromagnetic terminal being of bipolar construction completes a closed magnetic circuit when raised into contact with the cover of the receptacle when the current is closed.

I preferably employ for the terminal or contact device, as shown in Fig. 12, a secondary or shunt coil 68 and which I may use exclusively as shown in Figs. 5 and 6, wherein the winding or coil of the supply-conductor may be entirely dispensed with.

In the construction shown in Figs. 7 and 8 the feeder or supply current passes directly from the supply-conductor 44 through its conductor-clamp 45, the flexible connections 60, and metallic connecting-arm 59 to the magnet-core or contact-terminal 57.

In the construction illustrated in Figs. 12 and 13 the feeder or supply current passes directly from the supply-conductor 11, its conductor-clamp 45, flexible connections 60, thence through the insulated connecting-bolts 66, through the insulated conductor 64, wound about the cores or spools of the contact device 76, after which it finally makes metallic connection at the clamp 67ª with the bottom or yoke 67 of the contact device.

The object of the feeder winding or coil 64 is to assist, with the secondary or shunt coil 22, in energizing the contact terminal or device 17 when the same is raised into contact with the top or cover 12 of the contact-receptacle.

One end of the secondary or shunt coil 22, Figs. 7 and 8, and 12 and 13, is preferably connected to one of the working conductors or contact-posts, or it may be connected directly to the cover of its contact-receptacle, while the other end is connected to a predetermined calibrated resistance 18, preferably located within the lower compartment of the contact-receptacle, and the other end of the resistance is preferably connected directly to one of the continuous track or service rails.

It will be readily understood that the secondary or shunt coil, with its resistance, is connected in shunt across the service or track rails and one of the sections of the twin working conductor or contact posts.

It will be understood that one member of the twin sectional working conductor or one of the twin posts being bonded to the cover of the contact-receptacle will receive the full supply of current from the feeder or supply-conductor when the contact device is raised into contact with said cover and the circuit is closed, while the other member of working conductor or post serves only to receive current from the collector for the purpose of transmitting the same to the secondary, shunt, or energizing coil of the contact device, as before described.

Referring to Figs. 7 and 8, I preferably employ a sheet of hard rolled copper or composition thereof, 75, to cover the flattened-headed projections or cores 76, constituting the cores of the contact device and bent upwardly to form a frictional contact with the top or cover of the contact device for the purpose of overcoming or destroying residual magnetism. This copper contact is preferably connected to a flanged cleat 77, adapted to slide between the flattened heads 78 of the headed projections or cores 76 and be retained in such position by bending the ends of the flanges of said cleat laterally around the corners of said headed projections or spools 76, as shown at 79 in Fig. 10, and the cleat 77 is preferably provided with a central tubular projection 80, adapted to loosely receive the guide-rod 56, Figs. 7 and 8, upon which the contact device is freely and independently mounted, as before described.

I may employ a carbon plate 81, Fig 11, instead of the copper contact-plate before described, which is preferably secured in position upon the headed projections or cores 82 by means of a flanged cleat 83, preferably bolted to said carbon plate, as shown at 84 in Fig. 11.

By means of the foregoing construction the electromagnets upon the vehicle, heretofore used to attract a contact device or terminal to close the circuit to charge a working conductor, have been dispensed with, and the function of said magnets is performed by this secondary or shunt coil upon the contact device, for when the collector or shoe shall have bridged over or entered upon a section of the working conductors a portion of the current transmitted to that section by the shoe will pass through the secondary or shunt coil of its contact device, thereby raising the same and closing the feeder-circuit for that section of the working conductor, which will become charged before the collector shall have left the last section, and so repeat throughout the system.

It is evident that by the use of a suitable length of collector or contact shoe the feeder-circuit is never interrupted or broken in supplying current to the vehicle-motor. Consequently "arcing" can never occur within the contact-receptacle in the making and breaking of contact within same, as the circuit is first broken on the working conductor by the collector or shoe.

Referring to Figs. 1, 2, 3, and 4, I have shown a collector or shoe which may be carried by any suitable spring-actuated frame or gravity-hanger secured to the vehicle, though insulated from it, and the collector may be of any desired length and of any preferred construction and provided with suitable electric connections with the vehicle-controller and motors, as shown, the latter in turn being electrically connected with the vehicle wheel or truck and to the service or track rails conveying the return current to the generator, as indicated. I may also employ two collectors of like construction, one at each end of the vehicle.

When this system is used for street-railways, the working conductors may be surrounded by asphaltum, each section being half the length of the vehicle or motor-car. The spaces between the ends of the sections may be from one to two inches, which are also filled in with asphaltum. The covers of the contact-receptacles will be even with the street-pavement, and it will be understood that the contact-receptacles can be readily opened for inspection and that all parts appertaining thereto are readily interchangeable. There are neither mechanical nor electrical complications in the construction, neither is there friction to overcome in the operation of the contact device or terminal within the contact-receptacle, as above described. The same being loosely mounted and guided is free to the alternate action of upward magnetic attraction and gravitation.

The operation of this system will be readily understood from the foregoing description when taken in connection with the accompanying drawings and the following explanation thereof: As the vehicle or motor-car proceeds forward or backward and its collector or shoe enters upon the next section of the working conductor the current will be transmitted to that section by the shoe, dividing itself through the two parallel members of the working conductor of that section, closing the shunt-circuit, thereby raising the contact device or supply-terminal against the cover or top of the contact-receptacle, closing the supply or feeder circuit, and transmitting the same to the vehicle or motor-car before its collector or shoe shall have left the preceding section of the working conductor, thus insuring the attainment of a high rate of speed by the vehicle and perfect contact. When the collector or shoe shall have entirely left a section of the working conductor, both circuits will have been broken for that section, and the contact device or supply-terminal being unencumbered will drop by its own gravity, thus rendering that section dead again.

It will be understood that this system is applicable to all conditions of road-beds, at switches, track-crossings, and particularly at stations and in freight yards, and leakage or grounding of current can only occur in one section at a time when charged, and in open-country stretches each section of working conductors may be one hundred or more feet in length, requiring fifty or less contact-receptacles per mile.

I do not desire to confine myself to the specific construction, combination, and arrangement of parts herein shown and described, and I therefore reserve the right to make all such changes in and modifications of the same as come within the scope of my invention.

Having accurately described my invention, what I claim as new, and desire to secure by Letters Patent, is—

1. A free or independent contacting electromagnetic terminal carrying means for prelimininary excitation.

2. A free or independent contacting electromagnet, the core whereof forms the terminal of the supply of feeder-current, and having means for the preliminary excitation thereof.

3. A free or independent contacting electromagnetic terminal operated by a shunt-circuit and gravitation.

4. A free or independent contacting electromagnet operated by a shunt-circuit and gravitation.

5. A free or independent reciprocating contacting electromagnet operated by a shunt-circuit and gravitation.

6. A free or independent contacting electromagnet, provided with a winding or coil, adapted to receive a shunt-circuit.

7. A free or independent contacting electromagnet provided with a winding or coil and resistance, adapted to receive a shunt-circuit, and connected in shunt across one of the working conductors and track or service rail.

8. A contacting device or terminal embodying an electromagnet provided with a shunt winding or coil having connection with one of the working conductors and track or service rail.

9. A free or independent contacting electromagnet having supply connections whereof it forms a terminal, and carrying means for the preliminary excitation thereof, sectional working conductors an armature connected with one member of the latter and means for forcing said electromagnet into contact with said armature.

10. A free or independent contacting electromagnet having supply connections whereof it forms a terminal and carrying means for the preliminary excitation thereof, sectional working conductors, means connected with one member thereof to receive said electromagnet and a winding or coil upon said electromagnet connected with the working-conductor track-rail to force said electromagnet into connection with said means.

11. A free or independent contacting electromagnet having supply connections, sectional working conductors, an armature connected therewith, and a winding upon said electromagnet and connected with said working conductor and track or service rail.

12. A free or independent contacting electromagnet, having supply connections, sectional working conductors, a device connected with the latter against which said electromagnet contacts, connections for said electromagnet, with the working conductor and track or service rail and means for reducing the current passing through said connections.

13. A contacting electromagnet provided with cores having a winding or coil connected with a working conductor and track or service rail, and having supply connections, and an armature connected with the other working conductor, and means carried by the vehicle to energize said magnet and close the supply-circuit.

14. A contact system embodying twin working conductors, and a contacting electromagnet, forming a terminal of the supply-conductor, having an energizing winding or coil connected with one member of the working conductor, and track or service rail.

15. A contact system embodying twin sectional working conductors, an armature connected with one member thereof, a contacting electromagnet having supply connections and a winding or coil connected within the other member of said conductors and track or service rail.

16. A contact system embodying twin working conductors, an armature connected with one member thereof, a contacting electromagnet having supply connections, and a winding or coil connected with the other member of said conductors and a resistance connected with said coil and with track or service rail to force said electromagnet into contact with said armature when the energizing-circuit is closed.

17. A contact system embodying sectional working conductors, an armature connected with one member thereof, a contacting electromagnet having supply connections, a winding or coil upon said electromagnet, connected with the other member of said working conductor and with the track or service rail, and a collector or shoe upon the vehicle adapted to bridge or span said conductors and to close the circuit through said winding or coil to raise said electromagnet into contact with said armature and close the supply-circuit through the other member of the working conductors.

18. A contacting device embodying a contacting bipolar electromagnet the cores whereof are provided with a winding or coil connected with a working conductor and track or service rail.

19. A contact system provided with a receptacle having a guide pin or rod, a contacting electromagnet mounted freely or independently thereon and means carried by said electromagnet for the preliminary excitation thereof.

20. A contact system provided with a receptacle, and a contacting electromagnet movably mounted therein, having a winding or coil connected with a working conductor and track or service rail, to raise said device into contact with said receptacle.

21. A contact system provided with a receptacle, and an electromagnet movably mounted therein, having supply connections and provided with a winding or coil to raise said electromagnet into contact with said receptacle and close the supply-circuit therethrough.

22. A contact system provided with a receptacle, a contacting electromagnet movably mounted therein, having supply connections and provided with a winding or coil connected with a resistance to reduce the current sufficient to merely energize said electromagnet and close the supply-circuit through said receptacle.

23. A contact system provided with a receptacle, an electromagnet movably mounted therein having a winding or coil for the preliminary excitation thereof, and flexible connections between said electromagnet and the source of supply to provide for the free or independent movement of the electromagnet.

24. A contact system provided with a receptacle having connections with the source of supply, an electromagnet movably mounted therein and having a winding or coil for the preliminary excitation thereof, a connector-clamp attached to said supply connections and flexible connections between said clamp and electromagnet to provide for the free or independent movement of the electromagnet.

25. A contact system provided with a receptacle having supply connections, an electromagnet movably mounted therein having a winding or coil for the preliminary excitation thereof provided with a resistance, a connector-clamp attached to said supply connections and flexible bands attached to said clamp and electromagnet to convey the supply-current to the latter and permit of the free or independent movement thereof.

26. A contact system embodying twin working conductors, a contact-receptacle bonded to one member thereof, an electromagnet movably mounted in said receptacle having an energizing winding or coil connected with the other member of said conductors and track or service rail and flexible conductors connected with said electromagnet and source of electrical supply, whereby said device is raised into contact with said receptacle when the circuit is closed through said energizing-coil and the bonded member of the working conductor is charged with the supply-current.

27. An electromagnet provided with an energizing winding or coil and supply connections, said electromagnet having a contact-plate, provided with tongue-and-grooved connections therewith.

28. An electromagnet provided with an energizing winding or coil and supply connections, a cleat carrying a contact-plate secured upon said electromagnet by deflecting the extremities of the cleat around the cores of said device.

29. A contact system provided with a receptacle, an electromagnet movably mounted therein having an energizing winding or coil and supply connections, and a contact-plate frictionally connected with said electromagnet to prevent residual magnetism during operation of said device.

30. An electromagnet, having an energizing winding or coil, a connector-arm attached to said electromagnet, a connector-clamp having supply connections and flexible connections between said arms and clamp to convey the supply-current to said electromagnet.

In testimony whereof I have hereunto affixed my signature in presence of two witnesses.

WILLIAM GRUNOW, JR.

Witnesses:
CHARLES S. ROGERS,
M. L. SHAY.